United States Patent
Sasaki

(10) Patent No.: US 7,180,661 B2
(45) Date of Patent: Feb. 20, 2007

(54) CONFOCAL SCANNING MICROSCOPE

(75) Inventor: Hiroshi Sasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 263 days.

(21) Appl. No.: 11/002,836

(22) Filed: Dec. 2, 2004

(65) Prior Publication Data

US 2005/0122579 A1    Jun. 9, 2005

(30) Foreign Application Priority Data

Dec. 5, 2003    (JP)    ............... 2003-407666

(51) Int. Cl.
*G02B 21/06* (2006.01)
*G01J 3/30* (2006.01)
*F21V 9/16* (2006.01)

(52) U.S. Cl. .............. 359/385; 359/368; 356/318; 250/458.1

(58) Field of Classification Search ........... 359/385, 359/368; 356/317, 318; 250/458.1, 459.1, 250/461.1, 461.2

See application file for complete search history.

(56) References Cited

U.S. PATENT DOCUMENTS 6,094,300 A    7/2000    Kashima et al.
6,677,566 B2    1/2004    Knebel et al.
2003/0197924 A1*    10/2003    Nakata ................. 359/368

FOREIGN PATENT DOCUMENTS

JP    10-206742 A    8/1998
JP    2002-82287 A    3/2002

* cited by examiner

Primary Examiner—Alessandro Amari
(74) Attorney, Agent, or Firm—Frishauf, Holtz, Goodman & Chick, P.C.

(57) ABSTRACT

A confocal scanning microscope includes a stimulating light beam scanning unit that scans at least a predetermined plane perpendicular to the depth direction of the stimulating light beam focal position, a stimulating light beam scanning control unit that controls the scanning area of the stimulating light beam to a desired area, an exciting light beam scanning control unit that controls the scanning area of the exciting light beam to a desired area, an exciting light beam focal position changing unit, provided in an excitation fluorescence optical path, which is a portion of an optical path where the exciting light beam and the fluorescence pass and located outside a common optical path where the exciting light beam, the fluorescence, and the stimulating light beam pass, that changes at least the exciting light beam focal position in the depth direction, and an exciting light beam control unit that controls the exciting light beam focal position variably to a desired position.

20 Claims, 10 Drawing Sheets

CONFOCAL SCANNING MICROSCOPE

CROSS-REFERENCE TO RELATED APPLICATION

This application is based upon and claims benefit of priority from the prior Japanese Patent Application No. 2003-407666, filed on 2003, Dec. 5th; the entire content of which is incorporated herein by reference.

BACKGROUND OF THE INVENTION

1) Field of the Invention

The present invention relates to a confocal scanning microscope that irradiates a fluorescent-dyed specimen with stimulating light and detect fluorescence emitted from the specimen for observation of spatial fluorescence distribution and influence of the stimulating light.

2) Description of the Related Art

It is known that confocal scanning microscopes that employ a stimulating laser to stimulate a specimen are effectively used in the caged method, Fluorescence Loss in Photobleaching (FLIP), or the like. According to the caged method, a caged reagent and a fluorescence indicator, which is calcium sensitive to indicate the calcium ion concentration, are injected into a specimen, and a stimulating laser beam is irradiated to a portion of the specimen to generate a cleavage in a caged group of the caged reagent. When the caged group is cleaved, substances contained inside is discharged and the calcium ion concentration thereof is changed. An exciting laser beam is irradiated onto the specimen for the fluorescent observation of the change in calcium ion concentration over time. On the other hand, according to the FLIP, a specific portion in a cell is bleached through repetitive irradiation with a stimulating laser beam. Then, diffused protein causes decrease in fluorescence intensity in a surrounding area. The process of decreasing fluorescence intensity is observed over time with the use of an exciting laser beam, which allows the observation of fluorescence emitted from the irradiated specimen. In both the caged method and the FLIP, during fluorescence observation of the specimen over time, it is important to maintain two different irradiations of laser beams to the specimen, that are, the stimulating laser beam which gives light stimulus to a specific portion of the specimen and the exciting laser beam which allows the fluorescence observation (see U.S. Pat. No. 6,094,300).

Recently, there is a high demand for the realization of three-dimensional fluorescence observation of the specimen. Also for the caged method and the FLIP mentioned above, it is highly demanded that three-dimensional fluorescence observation be realized through the irradiation of an exciting laser beam for observation achieved while the light stimulus is given to an optional portion through the irradiation of a stimulating laser beam, for example. However, the light collective plane perpendicular to the optical axis of the stimulating laser beam and the light collective plane perpendicular to the optical axis of the exciting laser beam for observation is determined according to the distance between the specimen and the objective lens, and thus basically they are the same plane. Therefore, in the three-dimensional fluorescence observation of the specimen, if the distance between the specimen and the objective lens is changed by a microscope focus adjusting mechanism such as a stepping motor, the light collective plane of the stimulating laser beam and the light collective plane of the exciting laser beam for observation are both changed so that the light stimulus cannot be provided continuously to a desired area in the three-dimensional space in the specimen. Thus, it may be difficult to observe the fluorescent specimen three-dimensionally while providing the light stimulus continuously or repeatedly by the stimulating laser beam to an area including an optional point in the specimen. Hence, there may be a problem that the advantage of a confocal scanning microscope that the three-dimensional fluorescence observation is possible by the confocal effect in combination with a light stimulus, can not be exerted, thus a fluorescent image cannot be obtained in a desired condition.

SUMMARY OF THE INVENTION

The present invention has been achieved in order to solve the above problems.

According to the confocal scanning microscope of the present invention, a confocal scanning microscope that irradiates a specimen with a stimulating light beam that causes optical chemical change to the specimen, focuses an exciting light beam to an exciting light beam focal point so as to irradiate the specimen with the exciting light beam, and scans the exciting light beam at least in a plane perpendicular to a depth direction, thereby allowing observation of fluorescence which also indicates the influence of the stimulating light beam, includes a stimulating light beam scanning unit that scans at least a predetermined plane perpendicular to the depth direction of the stimulating light beam focal position, a stimulating light beam scanning control unit that controls the scanning area of the stimulating light beam to a desired area, an exciting light beam scanning control unit that controls the scanning area of the exciting light beam to a desired area, an exciting light beam focal position changing unit, provided in an excitation fluorescence optical path, which is a portion of an optical path where the exciting light beam and the fluorescence pass and located outside a common optical path where the exciting light beam, the fluorescence, and the stimulating light beam pass, that changes at least the exciting light beam focal position in the depth direction, and an exciting light beam control unit that controls the exciting light beam focal position variably to a desired position.

DETAILED DESCRIPTION OF THE INVENTION

Exemplary embodiments of a confocal scanning microscope according to the present invention are explained in detail with reference to the accompanying drawings.

Figure 1:
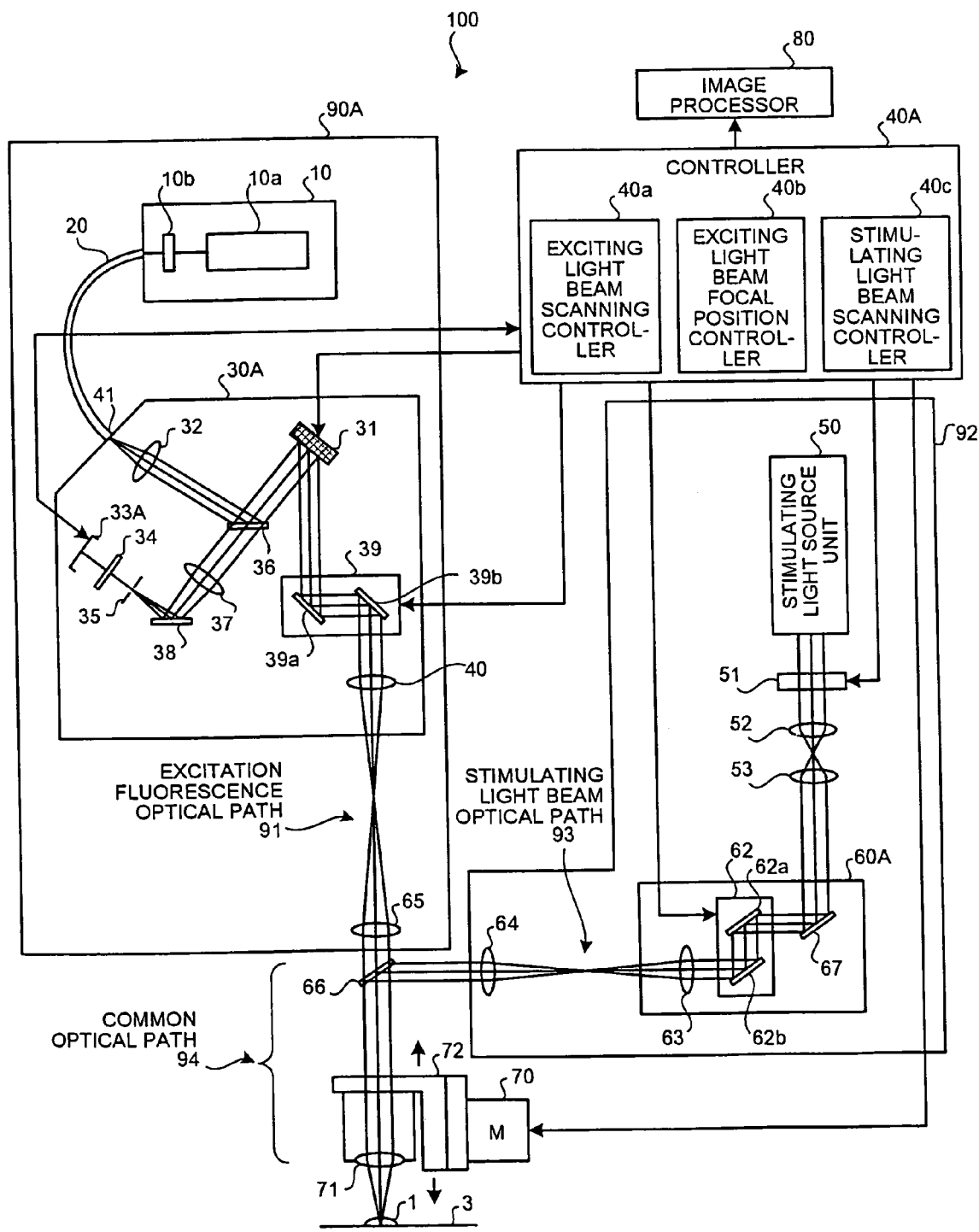
FIG. 1 is a block diagram of the schematic configuration of a confocal scanning microscope according to a first embodiment of the present invention.

FIG. 1 is a block diagram of a schematic configuration of a confocal scanning microscope 100 of the first embodiment. The confocal scanning microscope 100 includes an exciting light beam irradiating unit 90A that controls an exciting light beam and a fluorescence, a stimulating light beam irradiating unit 92 that controls a stimulating light beam, and a controller 40A that controls the exciting light beam irradiating unit 90A and the stimulating light beam irradiating unit 92. The confocal scanning microscope 100 further includes, in a common optical path 94 provided commonly for an excitation fluorescence optical path 91 for the passage of an exciting light beam and a fluorescence and a stimulating light beam optical path 93 for the passage of a stimulating light beam, a combining dichroic mirror 66, an objective lens 71, a guide driving mechanism 72 that supports the objective lens 71, a motor 70 that drives the guide driving mechanism 72, a specimen 1 as the observation subject, and a specimen stage 3 for placing the specimen 1.

The controller 40A includes an exciting light beam scanning controller 40a, an exciting light beam focal position controller 40b, and a stimulating light beam scanning controller 40c. The exciting light beam scanning controller 40a controls the scanning plane of the exciting light beam by controlling a galvano mirror unit 39 in an exciting light beam scanning unit 30A. The exciting light beam focal position controller 40b controls the position in the depth direction of the focal point of the exciting light beam by controlling a deformable mirror 31 as a wavefront converting element in the exciting light beam scanning unit 30A. The stimulating light beam scanning controller 40c controls the scanning plane of the stimulating light beam by controlling a galvano mirror unit 62 in a stimulating light beam scanning unit 60A. Moreover, the controller 40A controls an optical detector 33A, an electrically driven shutter 51, and the motor 70, respectively.

The exciting light beam irradiating unit 90A includes an exciting light source laser unit 10, and the exciting light beam scanning unit 30A. The exciting light source laser unit 10 includes an argon laser oscillator 10a, and an acousto-optic element 10b. A laser beam of a 488 nm wavelength emitted from the argon laser oscillator 10a has the output intensity modulated by the acousto-optic element 10b so as to be emitted from the exciting light source laser unit 10 as the exciting light beam. The emitted exciting light beam is incident on the exciting light beam scanning unit 30A via a single mode fiber 20. The incident exciting light beam is incident on the deformable mirror 31 which functions as the wavefront converting element successively via a visible laser beam introducing port 41, a collimate lens 32, and an exciting dichroic mirror 36. The deformable mirror 31 can change the orientation of the light beam reflecting surface at a high speed, as described later, so that the incident light beam can be reflected variously as a converging light beam or a diverging light beam other than a parallel light beam. As a result, by varying the reflecting surface of the deformable mirror 31, the focal position in the depth direction of the exciting light beam can be varied. Since the reflecting surface of the deformable mirror 31 is controlled by the exciting light beam focal position controller 40b, the light flux of the exciting light beam reflected by the deformable mirror 31 is controlled and reflected so as to be directed to the galvano mirror unit 39. The exciting light beam incident on the galvano mirror unit 39 is scanned and controlled with a pair of galvano mirrors 39a and 39b, which are controlled by the exciting light beam scanning controller 40a. Then the exciting light beam is incident on a pupil projecting lens 40.

The exciting light beam incident on the pupil projecting lens 40 is emitted from the exciting light beam irradiating unit 90A through the excitation fluorescence optical path 91 via an imaging lens 65 so as to be incident on the combining dichroic mirror 66. The exciting light beam incident on the combining dichroic mirror 66 is collected to the focal point of the exciting light beam in the specimen 1 through the common optical path 94 via the objective lens 71.

The focal point of the exciting light beam in the specimen 1 is excited so as to emit a fluorescence of a 505 to 600 nm wavelength in the process of the transition to the ground state. The fluorescence emitted from the focal point of the exciting light beam proceeds backward in the common optical path 94 and the excitation fluorescence optical path 91 so as to reach the exciting dichroic mirror 36. The fluorescence transmits through the exciting dichroic mirror 36 and proceeds via the confocal lens 37 and the reflecting mirror 38 successively. By adjusting the position of the confocal pinhole 35, only the fluorescence emitted from the focal point of the exciting light beam passes through the confocal pinhole 35 so as to be incident on the optical detector 33A through a barrier filter 34. The fluorescence incident on the optical detector 33A is converted to an electric signal so as to be output to the controller 40A. The electric signal input to the controller 40A is output to an image processor 80 as a fluorescence signal so that the image processor 80 produces a fluorescence image according to the input fluorescence signal.

On the other hand, the stimulating light beam irradiating unit 92 includes a stimulating light source unit 50, an electrically driven shutter 51 that controls the output of the stimulating light beam, a pair of beam expanders 52 and 53, a stimulating light beam scanning unit 60A, and an imaging lens 64. An infrared pulse laser beam of a 720 nm wavelength is oscillated from the stimulating light source unit 50 so as to be emitted as a stimulating light beam when the electrically driven shutter 51 is open. The emitted stimulating light beam is incident on the stimulating light beam scanning unit 60A via the pair of the beam expanders 52 and 53. The stimulating light beam scanning unit 60A includes a mirror 67, the galvano mirror unit 62, and a pupil projecting lens 63 such that the stimulating light beam incident on the stimulating light beam scanning unit 60A is incident on the galvano mirror unit 62 via the mirror 67. The stimulating light beam incident on the galvano mirror unit 62 is scanned and controlled with the pair of the galvano mirrors 62a and 62b, which are controlled by the stimulating light beam scanning controller 40c. Then the stimulating light beam is emitted to the pupil projecting lens 63.

The stimulating light beam incident on the pupil projecting lens 63 passes through the stimulating light beam optical path 93 so as to be emitted from the stimulating light beam irradiating unit 92 via the imaging lens 64 and be incident on the combining dichroic mirror 66. The stimulating light beam reflected by the combining dichroic mirror 66 passes through the common optical path 94 so as to be focused on the focal point of the stimulating light beam in the specimen 1 via the objective lens 71.

When a substance present at the focal point of the stimulating light beam is dyed by a caged reagent and a fluorescence indicator sensitive to the calcium ion concentration, two photon excitation is caused at the focal point of the stimulating light beam so as to generate the cleavage of the caged group of the caged reagent. Since the two photons of a 720 nm wavelength are absorbed at the same time at the focal point of the stimulating light beam, two-fold energy of a 720 nm wavelength photon is generated at the focal point of the stimulating light beam so as to cause the two photon excitation. With one photon, the light stimulus is provided to the entire conical area in the specimen 1 whereat the stimulating laser beam passes through. However, with the two photon excitation, since the two photon excitation does not occur unless the two photons are absorbed at the same time, the two photon excitation is caused only at a position with the stimulating light beam focused in the specimen 1 so as to provide the light stimulus. This is effective particularly when the stimulus is provided only on one point in a three-dimensional space in the specimen 1. When the caged group is cleaved by the two photon excitation, substance contained inside is discharged to change the calcium ion concentration. When the calcium ion concentration is changed, the intensity of the fluorescence emitted in response to the exciting light beam of a 488 nm wavelength is changed.

Therefore, the three-dimensional fluorescence observation by the exciting laser beam for observation is possible in a state where the irradiating position of the stimulating laser beam used for giving stimulus to cause effect such as the caged release is fixed on one point to be stimulated in the specimen 1. Moreover, since the infrared pulse laser beam that causes the two photon excitation is used as the stimulating laser beam, the point to be stimulated can be limited to the focal position of the stimulating light beam in the three-dimensional space so that the accurate observation is possible by providing the stimulus at an accurate point without optically stimulating an undesired portion at the same time.

According to the FLIP, an infrared pulse laser of an 800 nm wavelength for the photo bleaching by the two photon excitation is used as the stimulating laser beam. Since the specimen is labeled with the fluorescence protein such as the Green Fluorescent Protein (GFP), when it is excited by a beam of a 488 nm wavelength for the fluorescence observation, a fluorescence of a 500 nm to 600 nm wavelength is emitted. According to the characteristics of the combining dichroic mirror 66 that combines the optical path of the stimulating laser beam and the optical path of the fluorescence observation exciting laser beam, the 800 nm wavelength stimulating laser beam is reflected, and the 488 nm wavelength fluorescence observation exciting laser beam and the 500 nm to 600 nm wavelength fluorescence are transmitted.

According to an ordinary photo bleaching method, since the wavelength of the stimulating laser beam for bleaching and the wavelength of the exciting laser beam for the observation of the fluorescence are same, loss is generated to either of the wavelengths according to the characteristics of the combining dichroic mirror 66 that combines the two optical paths. However, according to this embodiment, since the wavelength of the laser beam for bleaching and the wavelength of the observation laser beam for the observation of the fluorescence can be separated by using the infrared pulse laser beam as the stimulating laser beam. Hence, the characteristics of the combining dichroic mirror 66 can be set so that there would be no loss in either laser beams. This configuration is particularly effective because the light amount loss of the infrared pulse laser beam, which is used for photo bleaching requiring a high output, is little.

Figure 2:
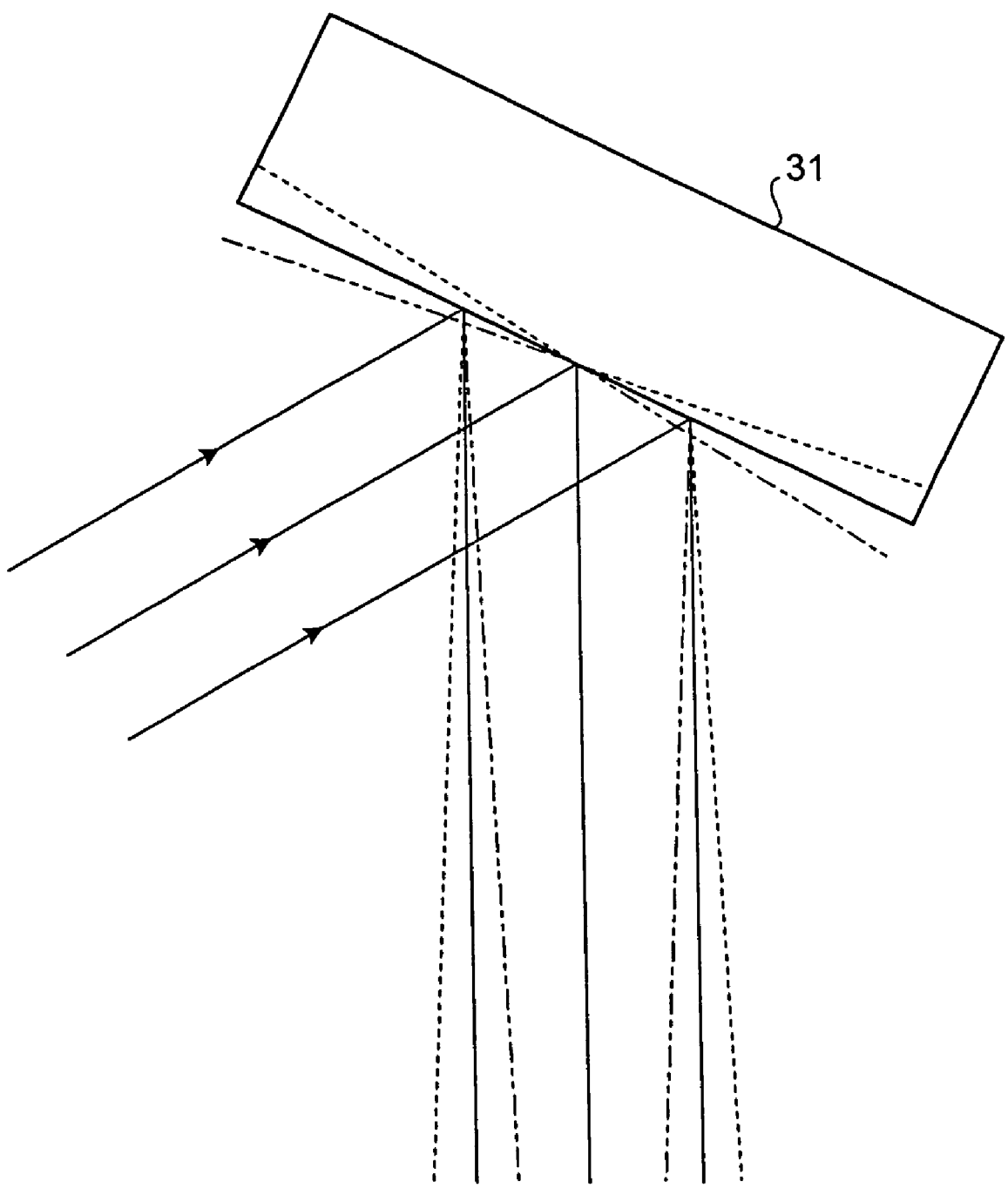
FIG. 2 is an explanatory diagram of a function of a deformable mirror according to the first embodiment of the present invention.
Figure 3:
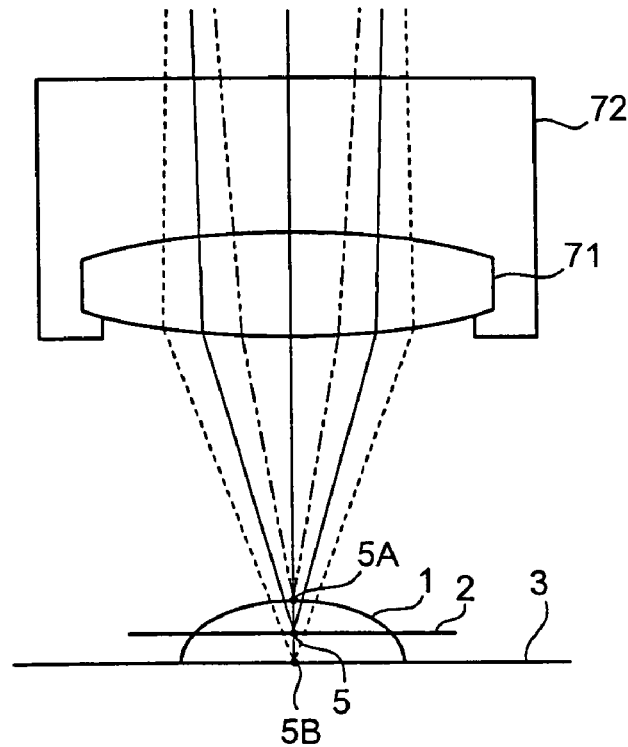
FIG. 3 is an explanatory diagram of a change in an exciting light beam focal point in the depth direction by the deformable mirror according to the first embodiment of the present invention.

As mentioned above, the deformable mirror 31 has the function of changing the position in the depth direction of the focal point of the exciting light beam and compensating the aberration of the incident light beam and the reflected light beam by changing the shape of the reflecting surface of the light beam. FIG. 2 depicts the change of the light flux of the reflected exciting light beam caused by the orientational variation in the reflecting surface cross section of the deformable mirror 31 by the control of the exciting light beam focal position controller 40b. When the reflecting surface cross section is deformed convexly, the exciting light beam becomes a diverging light beam, and when it is deformed concavely, the exciting light beam becomes a converging light beam. FIG. 3 depicts the change of an exciting light beam focal point 5 to a deep exciting light beam focal point 5B via the objective lens 71 when the exciting light beam reflected by the deformable mirror 31 becomes a divergent light beam, and the change of the exciting light beam focal point 5 to a shallow exciting light beam focal point 5A when the exciting light beam becomes a converging light beam. Thus, by varying the reflecting surface of the deformable mirror 31, the exciting light beam focal point 5 can be varied in the depth direction. Moreover, it is also shown that the depth of the exciting light beam scanning plane 2 can be changed according to the position change of the exciting light beam focal point 5.

Therefore, by scanning a predetermined exciting light beam scanning plane 2 while changing the position of the exciting light beam focal point 5 in the depth direction, the fluorescence distribution of the desired (predetermined) space in the specimen 1 can be obtained, whereby, through the conversion of the fluorescence intensity to an image signal, the fluorescence distribution in the predetermined space can be observed as a three-dimensional image. Moreover, by repeating the scanning operation of the predetermined space by the exciting light beam at a predetermined time interval, the change in the three-dimensional image of the fluorescence distribution over time can be observed. In other words, the change of the calcium ion concentration over time caused by the substance discharged under the influence of the stimulating light beam applied at a point can be observed three-dimensionally.

Figure 4:
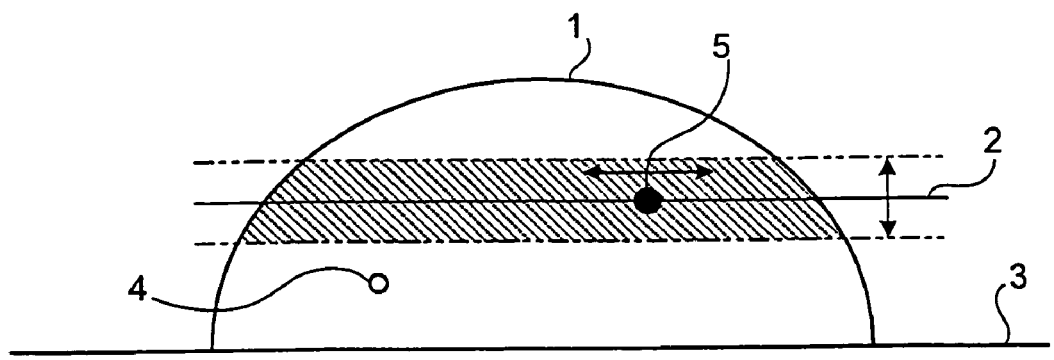
FIG. 4 is an explanatory diagram of obtainment of fluorescence distribution in a desired space independently of a stimulating light beam focal point according to the first embodiment of the present invention.
Figure 5:
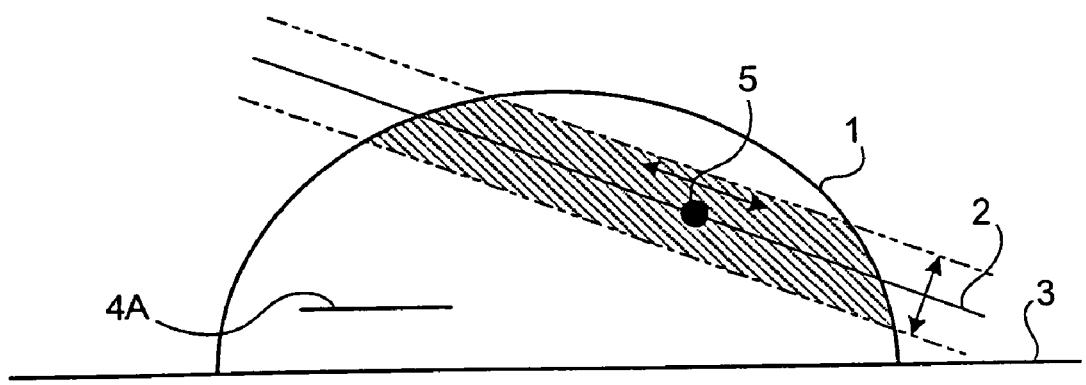
FIG. 5 is an explanatory diagram of obtainment of fluorescence distribution in a desired space with a sloped shape during stimulation of a desired plane according to the first embodiment of the present invention.

FIG. 4 depicts obtainment of fluorescence distribution in a desired space in the specimen 1 independently of the stimulating light beam focal point 4 as a result of the change in the position of the exciting light beam scanning plane 2 in the depth direction caused by the control of the deformable mirror 31 and the galvano mirror unit 39. FIG. 5 depicts obtainment of fluorescence distribution in a desired space with a sloped shape independently of the stimulating light beam focal scanning plane 4A as a result of the change of the position of the exciting light beam in the depth direction during the scanning with the exciting light beam through the simultaneous control of the deformable mirror 31 and the galvano mirror unit 39. When the exciting light beam scanning operation and the exciting light beam change in the depth direction are controlled in combination, the fluorescence observation of the curved face including a plane of an optional shape and the observation of a space of an optional shape in the specimen 1 are possible. For example, the fluorescence observation of a plane extending only in the exciting light beam depth direction is possible.

Figure 6:
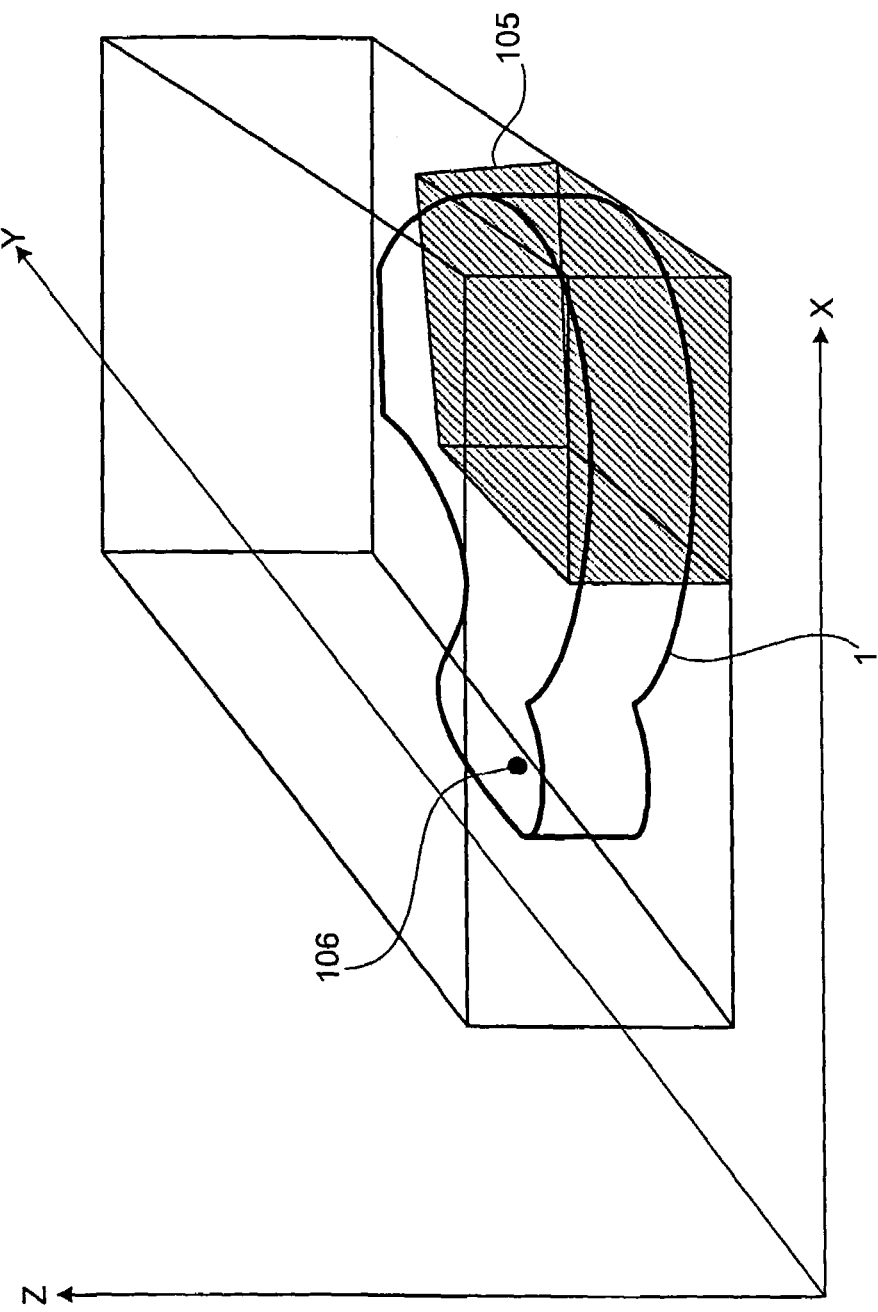
FIG. 6 is an explanatory diagram of obtainment of fluorescence distribution in a desired space through continuous or repeated stimulation of a desired point according to the first embodiment of the present invention.

In FIG. 6, the light depth direction is indicated by the Z axis and the planes perpendicular to the light depth direction are indicated by the X-Y axes. As can be seen from FIG. 6, since the fluorescence confocal image can be observed by scanning the desired space 105 in the specimen 1 with the fluorescence observation exciting laser beam while performing the bleaching by the two photon excitation by continuously or repeatedly irradiating the stimulating laser beam to a specific point 106 of the specimen 1, fluorescence observation of the change in the decreasing fluorescence intensity over time caused by the diffusion of the fluorescent protein in the desired space 105 in the outside area of the specific point 106 is possible confocally and three-dimensionally.

Figure 7:
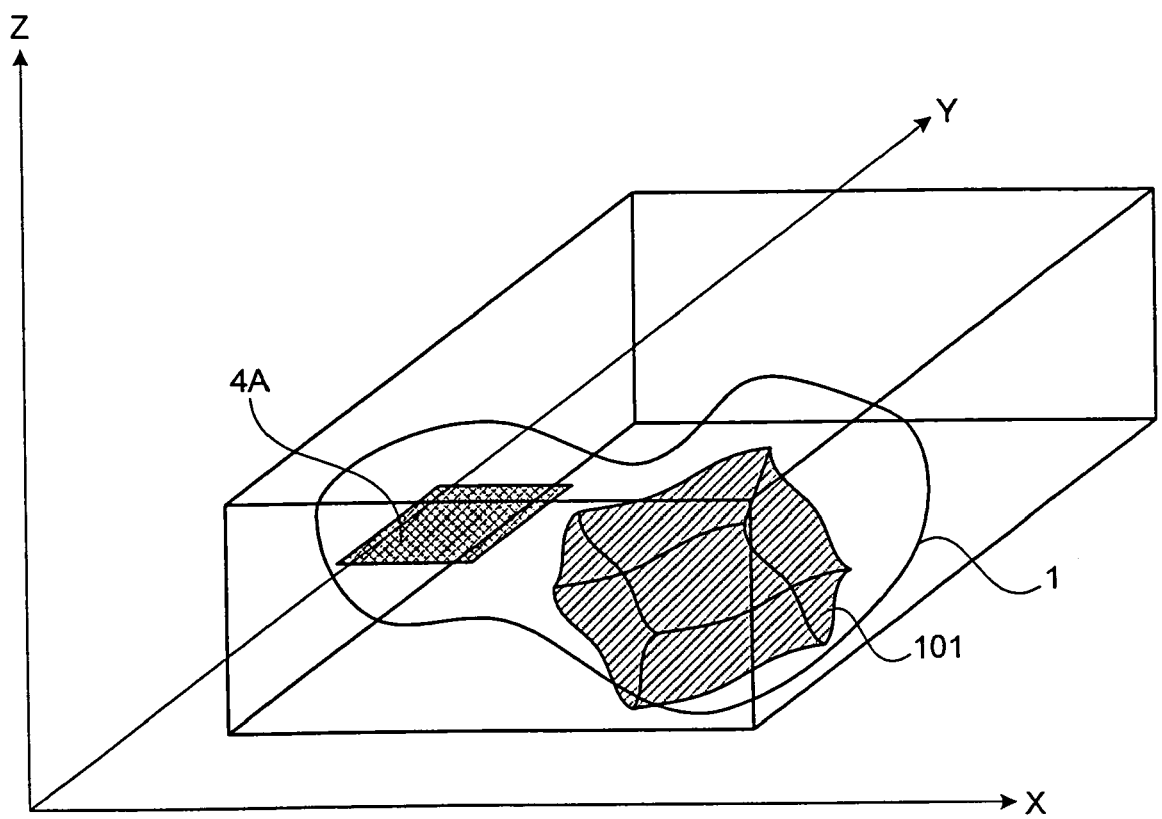
FIG. 7 is an explanatory diagram of obtainment of fluorescence distribution in a desired space at a predetermined time interval during stimulation of a desired plane according to the first embodiment of the present invention.

FIG. 7 depicts that the change over time of the influence of the stimulating light beam over the desired space 101 can be observed through the irradiation of stimulating light focal position scanning plane 4A in the specimen 1 with the stimulating light and the repetitive obtainment of the fluorescence distribution in the desired space 101 at a predetermined time interval. As shown in FIG. 7, the desired space 101 can be of any shape.

Figure 8:
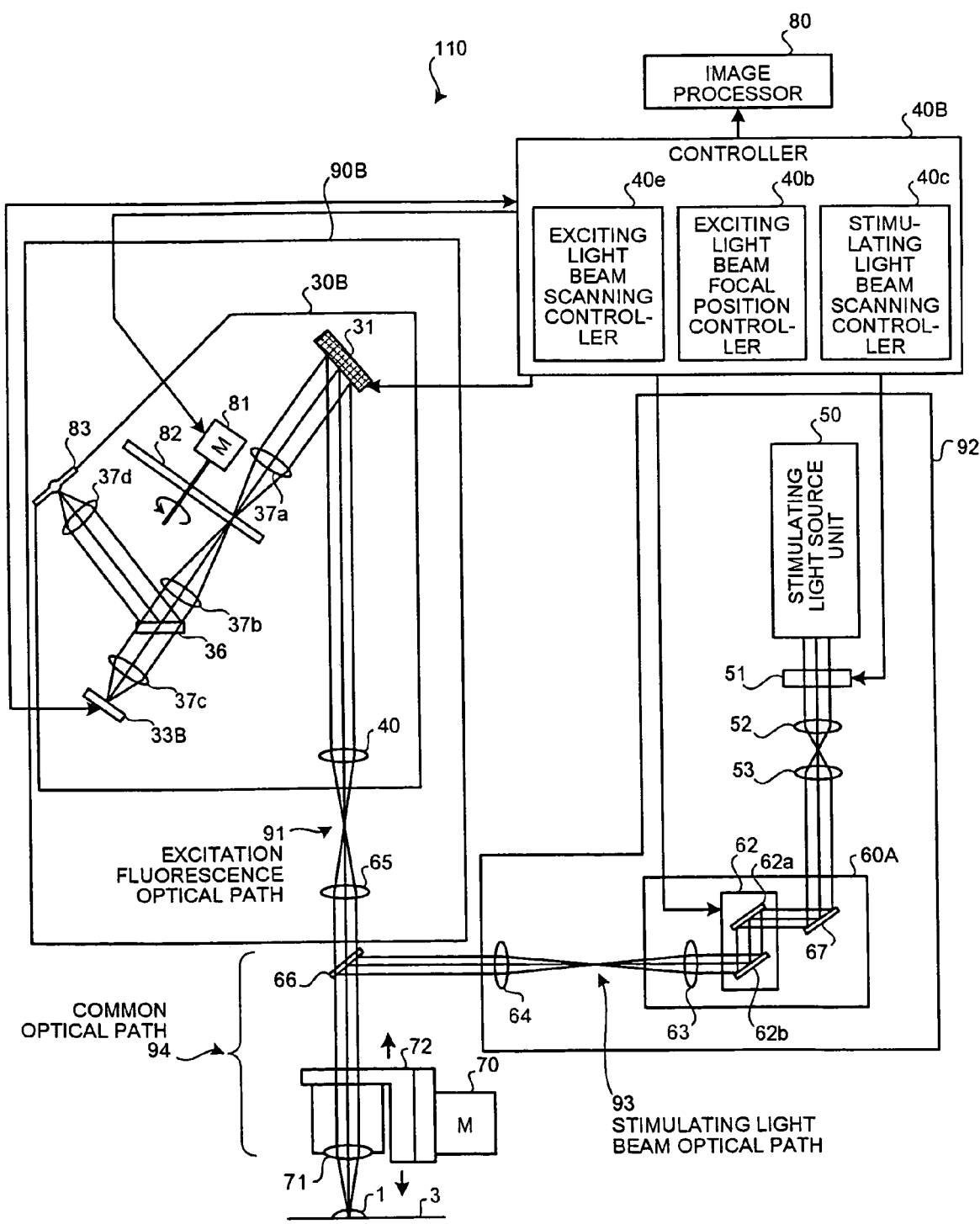
FIG. 8 is a block diagram of a schematic configuration of a confocal scanning microscope as a modified embodiment of the first embodiment according to the present invention.

Next, it is explained that the fluorescence distribution in a desired space can be obtained when the deformable mirror 31 is employed even if the exciting light beam light source is changed from the laser to a mercury lamp, the galvano mirror unit 39 to a Nipkow disc 82 with a plurality of pinholes, and the optical detector 33A to a charge coupled device (CCD) camera 33B. FIG. 8 is a block diagram of the schematic configuration of a confocal scanning microscope 110, which is a modified embodiment of the first embodiment. The confocal scanning microscope 110 includes an exciting light beam irradiating unit 90B instead of the exciting light beam irradiating unit 90A, a controller 40B instead of the controller 40A, and an exciting light beam scanning unit 30B instead of the exciting light beam scanning unit 30A. The same reference characters are applied to the same elements as in FIG. 1. A mercury lamp 83 mounted on the exciting light beam scanning unit 30B emits an exciting light beam. The exciting light beam is incident on the exciting dichroic mirror 36 via a collimate lens 37d. The exciting light beam incident on the exciting dichroic mirror 36 is reflected so as to be incident on the deformable mirror 31 successively via a lens 37b, the Nipkow disc 82, and a lens 37a. The deformable mirror 31 reflects the incident exciting light beam so as to emit the exciting light beam from the exciting light beam scanning unit 30B via the pupil projecting lens 40.

The Nipkow disc 82 is provided with a plurality of pinholes such that a plurality of exciting light beams pass through at the same time by the confocal effect of the pinholes, and also a plurality of fluorescences moving backward in the excitation fluorescence optical path pass through at the same time. Therefore, by rotating the Nipkow disc 82 by the control of the rotation of the motor 81 by the exciting light beam scanning controller 40e and detecting the fluorescence by the CCD camera 33B via the lens 37c, the fluorescence distribution of the predetermined plane in the specimen 1 can be obtained. Moreover, the exciting light beam focal position controller 40b controls the focal position in the depth direction of the exciting light beam by controlling the deformable mirror 31. By using the mercury lamp 83, the Nipkow disc 82, and the CCD camera 33B as the exciting light source, the change in the calcium ion concentration over time caused by substance discharged by the influence of the stimulating light beam applied to the point to be stimulated can be observed three-dimensionally.

Since a plurality of fluorescences can pass through at the same time by the use of the Nipkow disc 82, fluorescence distribution of a desired space can be obtained in a short time so that quick change can be dealt with. The same effect can be obtained also by the use of a slit disc, which is a round disc with a slit, instead of the Nipkow disc 82. Other than the mercury lamp 83, a xenon lamp, a light-emitting diode (LED), or the like can be used as the exciting light source so as to reduce the cost of the microscope.

Although a reflecting type deformable mirror 31 is used in the above embodiment, a transmission type liquid crystal optical element, a liquid crystal lens, or the like may be used.

The second embodiment of the present invention is explained next. Although the position of the focal point in the depth direction of the exciting light beam is changed by the use of the deformable mirror 31 in the first embodiment, according to the second embodiment, a deformable mirror 31B is provided also in the stimulating light beam optical path 93 outside the common optical path 94 such that the fluorescence distribution of a desired space can be obtained while the stimulus is provided by a stimulating light beam to the desired space.

Figure 9:
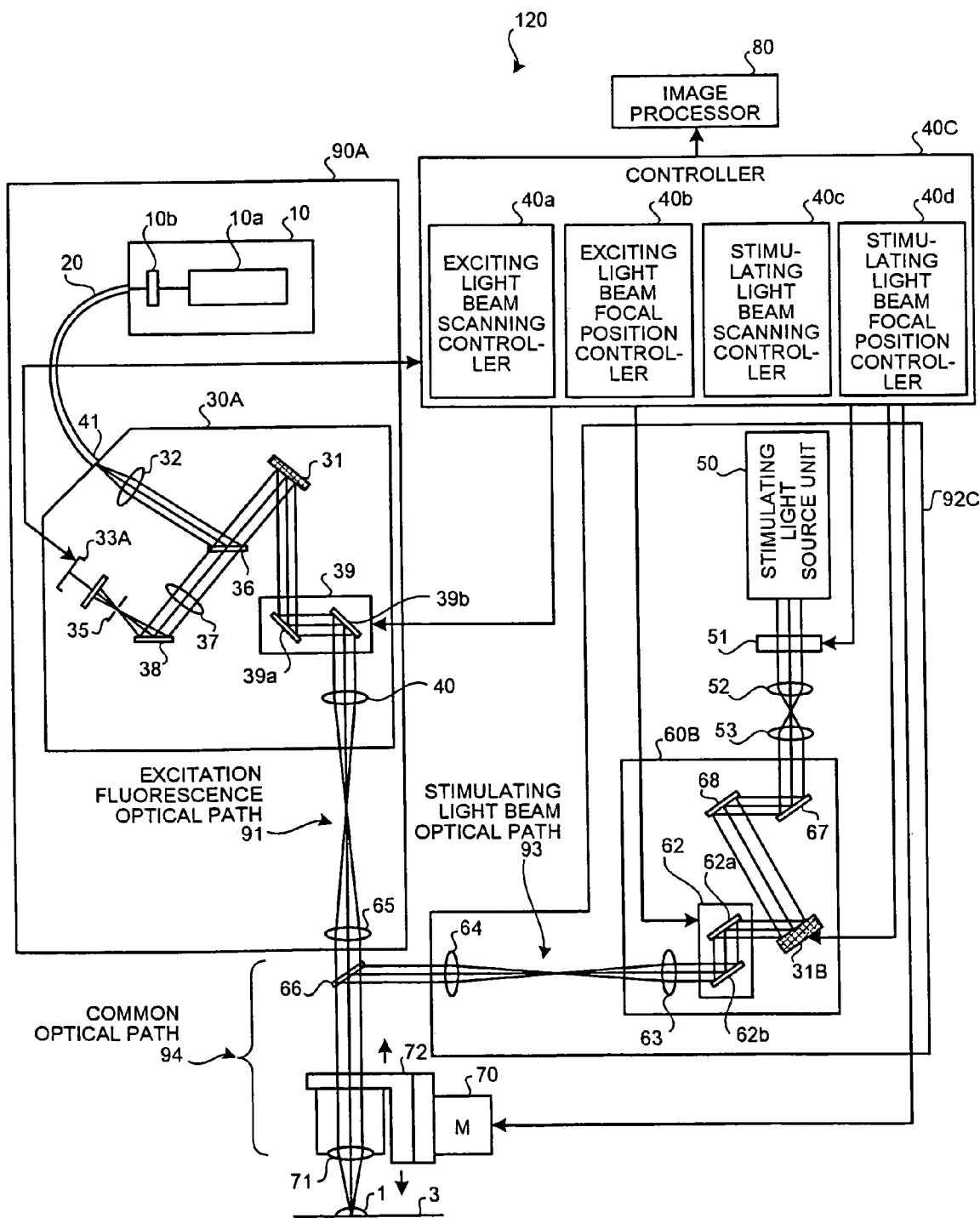
FIG. 9 is a block diagram of a schematic configuration of a confocal scanning microscope according to a second embodiment of the present invention.

FIG. 9 is a block diagram of a schematic configuration of a confocal scanning microscope 120 as the second embodiment of the present invention. A stimulating light beam scanning unit 60B includes mirrors 67 and 68, the deformable mirror 31B, the galvano mirror unit 62, and the pupil projecting lens 63. Moreover, a controller 40C includes the exciting light beam scanning controller 40a, the exciting light beam focal position controller 40b, the stimulating light beam scanning controller 40c, and a stimulating light beam focal position controller 40d. The same reference characters are applied to the same elements as in FIG. 1.

The exciting light beam scanning controller 40a controls the scanning of the exciting light beam scanning plane 2 by controlling the galvano mirror unit 39, whereas the exciting light beam focal position controller 40b controls the position in the depth direction of the focal point of the exciting light beam by controlling the deformable mirror 31. The stimulating light beam scanning controller 40c controls the scanning of the scanning plane of the stimulating light beam by controlling the galvano mirror unit 62, whereas the stimulating light beam focal position controller 40d controls the position in the depth direction of the focal point of the stimulating light beam by controlling the deformable mirror 31B.

Like the deformable mirror 31 described with reference to the first embodiment, the deformable mirror 31B has the function of changing the reflecting surface of the light beam and compensating the aberration of the incident light beam, and is disposed outside the common optical path 94. Therefore, through the control of the reflecting surface of the deformable mirror 31B, the position in the depth direction of the focal point of the stimulating light beam can be varied independently of the exciting light beam. Therefore, also with regard to the stimulating light beam, the depth direction can be changed during the scanning. Thus, also with the stimulating light beam, stimulus can be given to a space with an optional shape in the specimen 1.

Figure 10:
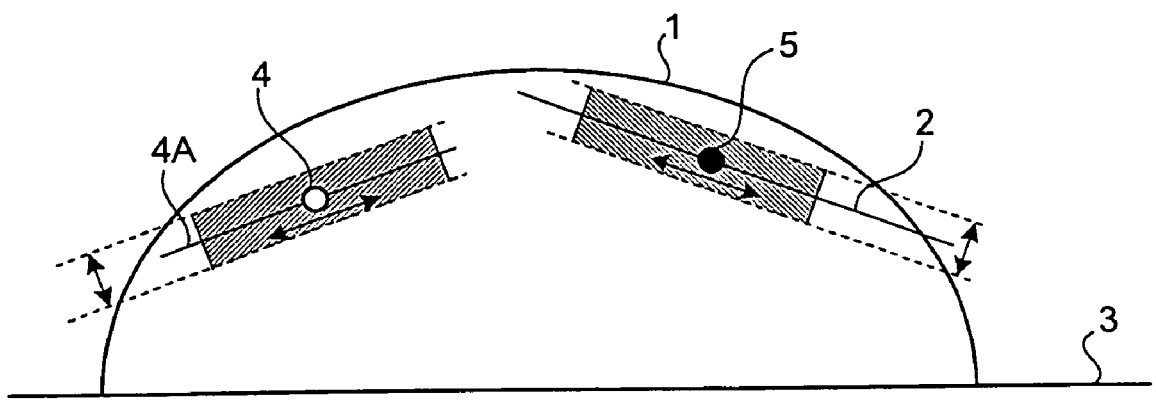
FIG. 10 is an explanatory diagram of obtainment of fluorescence distribution in a desired space during stimulation of a desired space according to the second embodiment of the present invention.
Figure 11:
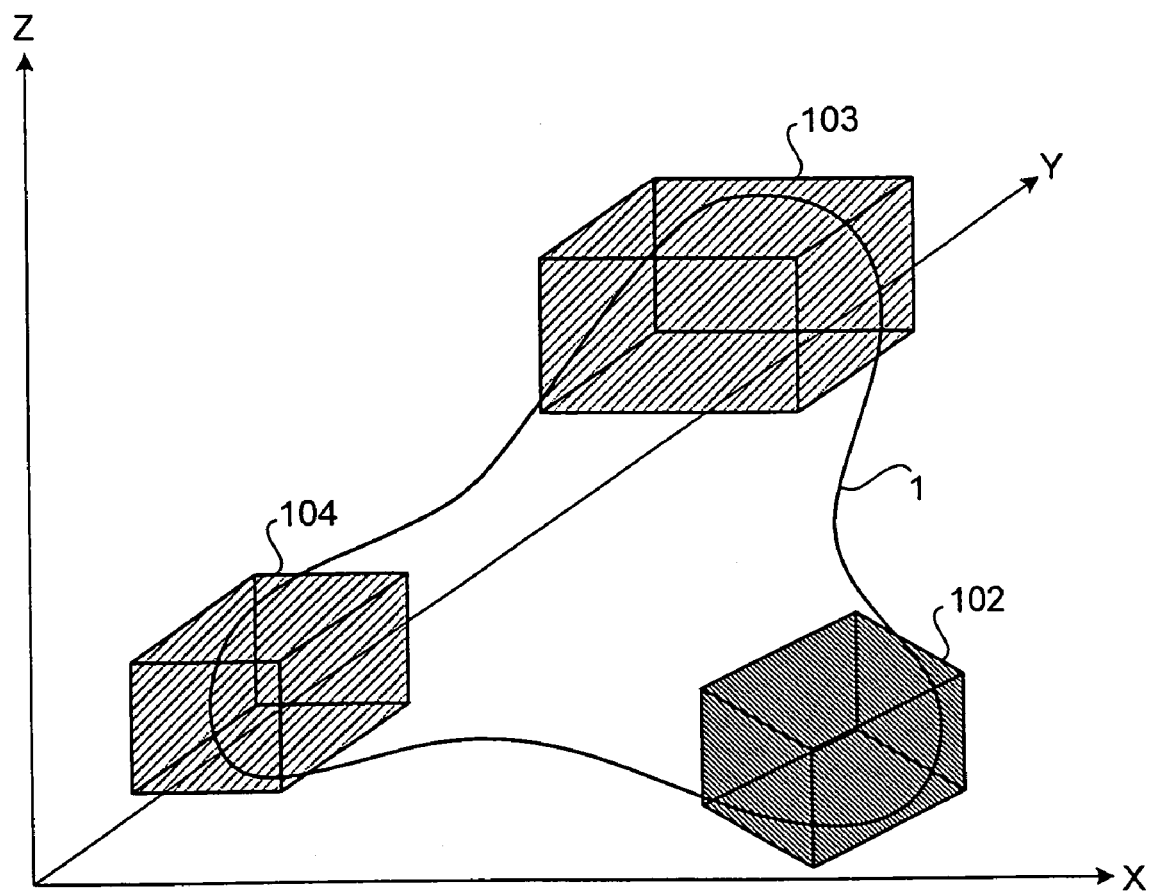
FIG. 11 is an explanatory diagram of obtainment of fluorescence distribution in a plurality of desired discrete spaces during stimulation of a desired space according to the second embodiment of the present invention.

FIG. 10 depicts the fact that when the position in the depth direction of the stimulating light beam is changed during the scanning of the stimulating light beam thereby giving the stimulus to an optional space in the specimen 1, and the position in the depth direction of the exciting light beam is changed during the scanning of the exciting light beam, the fluorescence observation of an optional space in the specimen 1 is possible. Furthermore, FIG. 11 depicts the fact that obtainment of the fluorescence distribution of the desired spaces 103 and 104 is possible while providing the stimulus to the desired space 102 in the specimen 1 by directing the exciting light beam to a plurality of discrete spaces. Similarly, the stimulus can be provided to a plurality of desired spaces by directing the stimulating light beam to a plurality of discrete spaces. As a result, the change over time in an optional three-dimensional area, different from the area where stimulus is applied, can be observed with the observation exciting laser beam while the light stimulus is provided to the optional three-dimensional area in the specimen 1. For example, when it is intended to observe the time difference in the occurrence of fluorescence diffusion at different portions depending on their distance from the area of stimulus application, one portion may be chosen as the area of stimulus application and two portions may be chosen for the observation. Alternatively, two portions may be chosen for the stimulus application and one portion may be chosen for the observation. Then, the stimulus is alternately given to each portion during the observation. Moreover, the desired spaces 102, 103, and 104 may be provided in an optional shape.

According to the above embodiments, since an exciting light beam focal position changing unit that changes the focal position of an exciting light beam in a depth direction is provided in an excitation fluorescence optical path outside a common optical path provided commonly for the stimulating light beam and an excited fluorescence, the exciting light beam focal position can be changed in the depth direction independently of the stimulating light beam focal position so that the effect of obtaining the influence of the stimulating light beam to a predetermined space can be achieved, for example, by scanning a predetermined plane while changing the exciting light beam focal position in the depth direction with the focal point of the stimulating light beam fixed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A confocal scanning microscope that irradiates a specimen with a stimulating light beam that causes optical chemical change to the specimen, focuses an exciting light beam to an exciting light beam focal point so as to irradiate the specimen with the exciting light beam, and scans the exciting light beam at least in a plane perpendicular to a depth direction, thereby allowing observation of fluorescence which also indicates the influence of the stimulating light beam, comprising:

a stimulating light beam scanning unit that scans at least a predetermined plane perpendicular to the depth direction of the stimulating light beam focal position;

a stimulating light beam scanning control unit that controls the scanning area of the stimulating light beam to a desired area;

an exciting light beam scanning control unit that controls the scanning area of the exciting light beam to a desired area;

an exciting light beam focal position changing unit, provided in an excitation fluorescence optical path, which is a portion of an optical path where the exciting light beam and the fluorescence pass and located outside a common optical path where the exciting light beam, the fluorescence, and the stimulating light beam pass, that changes at least the exciting light beam focal position in the depth direction; and an exciting light beam control unit that controls the exciting light beam focal position variably to a desired position.

2. The confocal scanning microscope according to claim 1, wherein the stimulating light beam scanning control unit controls the stimulating light beam so as to provide the stimulus to a desired point or a desired plane of the specimen, and the exciting light beam control unit and the exciting light beam scanning control unit control the exciting light beam so as to scan a predetermined space while changing the exciting light beam focal position in the depth direction so as to obtain the fluorescence distribution in the predetermined space.

3. The confocal scanning microscope according to claim 2, wherein a caged method or a Fluorescence Loss in Photobleaching observation is conducted.

4. The confocal scanning microscope according to claim 2, wherein the exciting light beam control unit controls the exciting light beam to scan a desired space which is apart from the point or the plane that is irradiated with the stimulating light beam, thereby obtaining the fluorescence distribution in the desired space.

5. The confocal scanning microscope according to claim 4, wherein the FLIP observation is conducted, in which the fluorescence distribution of the desired space is obtained successively at a predetermined time interval.

6. The confocal scanning microscope according to claim 2, comprising:

a stimulating light beam focal position changing unit, provided in the stimulating light beam optical path, which is a portion of an optical path where the stimulating light beam passes and located outside the common optical path, that changes at least the stimulating light beam focal position in the depth direction; and a stimulating light beam control unit that controls the stimulating light beam focal position variably to a desired position.

7. The confocal scanning microscope according to claim 2, wherein the fluorescence distribution of the desired space is obtained successively at a predetermined time interval.

8. The confocal scanning microscope according to claim 1, comprising:

a stimulating light beam focal position changing unit, provided in the stimulating light beam optical path, which is a portion of an optical path where the stimulating light beam passes and located outside the common optical path, that changes at least the stimulating light beam focal position in the depth direction; and a stimulating light beam control unit that controls the stimulating light beam focal position variably to a desired position.

9. The confocal scanning microscope according to claim 8, wherein the stimulating light beam control unit and the stimulating light beam scanning control unit control the stimulating light beam for scanning a predetermined space by changing the stimulating light beam focal position in the depth direction so as to provide the stimulus to the predetermined space, and the exciting light beam control unit and the exciting light beam scanning control unit control the exciting light beam for scanning the predetermined space by changing the exciting light beam focal position in the depth direction so as to obtain the fluorescence distribution in the predetermined space.

10. The confocal scanning microscope according to claim 9, wherein the fluorescence distribution of the desired space is obtained successively at a predetermined time interval.

11. The confocal scanning microscope according to claim 8, wherein the stimulating light beam control unit and the stimulating light beam scanning control unit control the stimulating light beam focal position changing unit and the stimulating light beam scanning unit, respectively, to sequentially irradiate either a plurality of spaces or a plurality of points with the stimulating light beam, and the exciting light beam control unit controls the exciting light to scan a predetermined plane by changing the focal position of the exciting light beam in the depth direction, whereby a responsive light emitted from the specimen is detected to provide an image of the desired space in the specimen.

12. The confocal scanning microscope according to claim 8, wherein at least one of the exciting light beam focal position changing unit and the stimulating light beam focal position changing unit is a wavefront converting element that performs conversion of input/output wavefront including compensation of aberration.

13. The confocal scanning microscope according to claim 1, wherein the exciting light beam focal position changing unit is a wavefront converting element that performs conversion of input/output wavefront including compensation of aberration.

14. The confocal scanning microscope according to claim 13, wherein the wavefront converting element is one of a deformable mirror and a liquid crystal optical element.

15. The confocal scanning microscope according to claim 1, wherein the stimulating light beam is an infrared pulse laser beam used for the multiple photon excitation and the exciting light beam is a laser beam that causes one-photon excitation of the specimen to produce fluorescence, and the confocal scanning microscope further comprises an optical element that combines the excitation fluorescence optical path and the stimulating light beam optical path, and transmits or reflects the laser beam for excitation, the fluorescence, and the infrared pulse laser beam for stimulation depending on the wavelength.

16. The confocal scanning microscope according to claim 15, wherein the stimulating light beam scanning control unit controls the stimulating light beam so as to give stimulus to a desired point or a desired plane of the specimen, and
the exciting light beam control unit controls the exciting light beam to scan a predetermined space which is apart from a point or a plane irradiated with the stimulating light beam by changing the focal position of the exciting light beam in the depth direction, whereby a fluorescence distribution of the predetermined space is obtained.

17. The confocal scanning microscope according to claim 16, wherein the FLIP observation is conducted, in which the fluorescence distribution of the predetermined space is obtained successively at a predetermined time interval.

18. The confocal scanning microscope according to claim 1, wherein a galvano mirror scans the exciting light beam in a direction perpendicular to the depth direction.

19. The confocal scanning microscope according to claim 1, wherein a disc scanner scans the exciting light beam in a direction perpendicular to the depth direction.

20. A confocal scanning microscope that: irradiates a specimen with an exciting light beam, focuses the exciting light beam on an exciting light beam focal point, and scans the exciting light beam at least in a plane perpendicular to a depth direction; and further, irradiates the specimen with a stimulating light beam that causes optical chemical change to the specimen, focuses the stimulating light beam on a stimulating light beam focal point, and scans the stimulating light beam at least in a plane perpendicular to the depth direction, thereby allowing observation of fluorescence which is emitted from the exciting light beam focal point and also indicates the influence of the stimulating light beam, comprising:
a wavefront converting element, provided in a stimulating light beam optical path, which is a portion of an optical path where the stimulating light beam passes and located outside a common optical path where, in addition to the stimulating light beam, the exciting light beam and the fluorescence pass, that changes at least the stimulating light beam focal position in the depth direction by performing conversion of input/output wavefront including the compensation of aberration; and
a stimulating light beam control unit that controls the stimulating light beam focal position variably to a desired position.

* * * * *